United States Patent [19]

Fulghum et al.

[11] 4,002,217
[45] Jan. 11, 1977

[54] AIR COOLED TRACTOR CARBURETOR

[75] Inventors: David A. Fulghum; David A. Powers, both of La Grange; Ross M. Lathrop, Downers Grove; Robert W. Swallow, Oak Lawn, all of Ill.

[73] Assignee: International Harvester Company, Chicago, Ill.

[22] Filed: Oct. 14, 1975

[21] Appl. No.: 621,978

[52] U.S. Cl. ............................................. 180/54 A
[51] Int. Cl.² ......................................... B60K 11/06
[58] Field of Search ............ 180/54 A, 54 C, 54 D, 180/54 R, 69 R

[56] References Cited
UNITED STATES PATENTS

| | | | |
|---|---|---|---|
| 2,294,945 | 9/1942 | Zink | 180/54 D |
| 2,705,540 | 4/1955 | Zierer | 180/54 A |
| 2,834,419 | 5/1958 | Sebok | 180/54 A |
| 3,147,814 | 9/1964 | Suhre | 180/54 A |
| 3,648,797 | 3/1972 | Lukens et al. | 180/54 D |
| 3,791,482 | 2/1974 | Sykora | 180/54 A |
| 3,884,322 | 5/1975 | Nemschoff | 180/69 R |

*Primary Examiner*—Joseph F. Peters, Jr.
*Assistant Examiner*—David M. Mitchell
*Attorney, Agent, or Firm*—William H. Wendell; Floyd B. Harman

[57] ABSTRACT

The addition of an air diverter to a tractor which has a partially enclosed engine, a shroud in arrangement for supplying cooling air to the engine and a carburetor operatively connected to the engine and mounted within the enclosure. The diverter separates a small portion of the cooling air from the main flow over the engine and uses this smaller flow to maintain an operable temperature for the carburetor.

2 Claims, 2 Drawing Figures

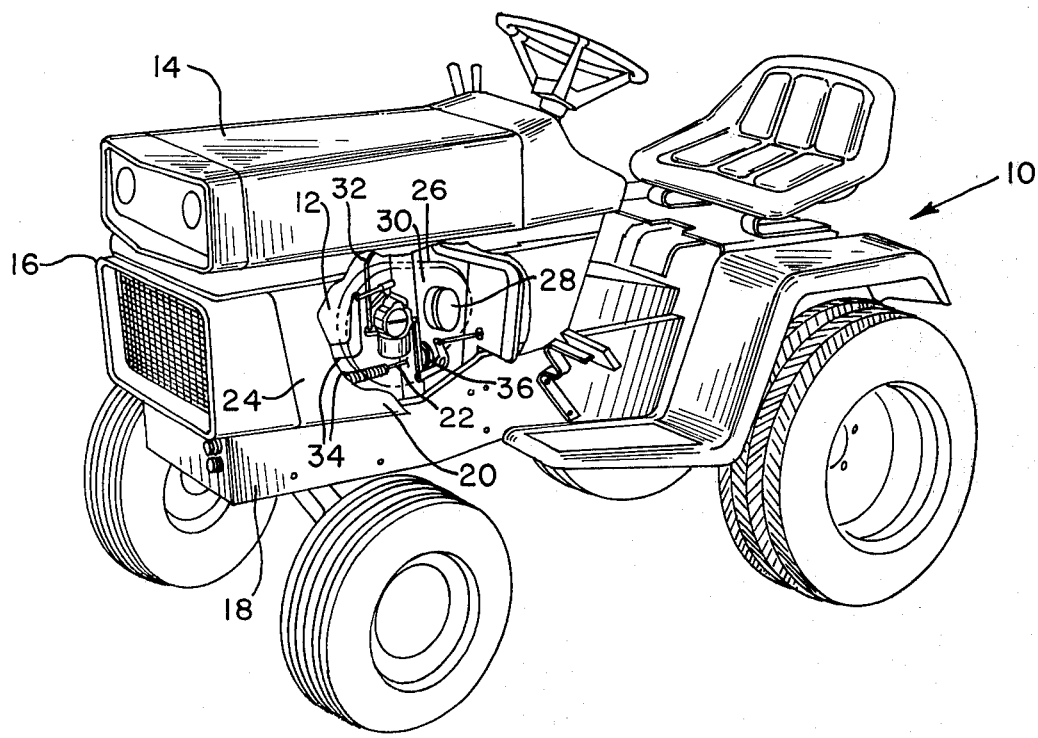
FIG-1-
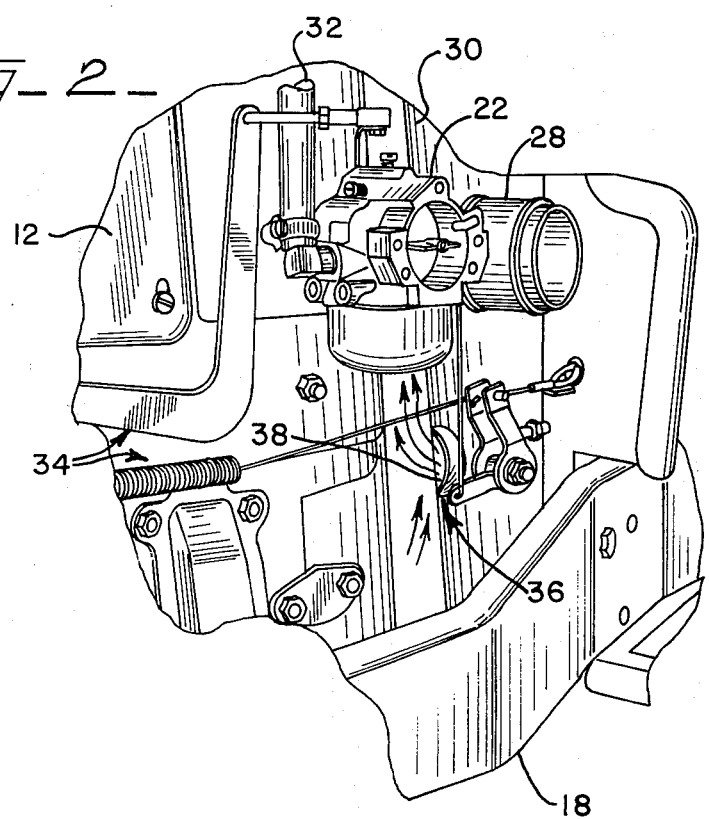
FIG-2-

AIR COOLED TRACTOR CARBURETOR

BACKGROUND OF THE INVENTION

This invention relates generally to structural configurations which control the operating temperature of a carburetor and more particularly concerns those which limit the maximum temperature of a carburetor during operation of the engine to which it is connected.

During the operation of the conventional exposed internal combustion engine, the temperature of the carburetor is normally the lowest temperature in the immediate vicinity of the engine. This condition results from the evaporation of the fuel within the carburetor which chills the air contacting the carburetor producing an extreme cooling effect in the carburetor. The accepted practice to overcome this cooling which can cause internal icing of the carburetor is to utilize a structure that provides a flow of exhaust air from the engine's exhaust system over or into the carburetor.

With the recent implementation of regulations limiting the sound emitted by tractors, there has been a trend towards enclosing sections of the tractor which act as sound producing sources. One of these enclosed areas is the section which supports the vehicle's engine. To effectively silence this sound source, extensive enclosures are utilized with the enclosures including the carburetor and air cleaner within their boundaries, thereby causing a reversal of the prior temperature control problems involving the carburetor. As a result of enclosing the engine, the natural flow of air over the engine and the external attachments thereto has been severely reduced with the operating temperature of the carburetor reaching a level which causes a vapor lock in the fuel system that stops the fuel flow.

Since the tractor configuration and operation does not lend itself to the use of a complete enclosure with complicated duct work for cooling and since the conventional systems teach only the addition of heat to the carburetor, it is accordingly an object of the present invention to provide a tractor having an engine enclosure with a cooling arrangement for the engine carburetor.

With more particularity, it is an object of the present invention to provide a carburetor cooling arrangement for a tractor with an air cooled engine.

Further, it is an object of the present invention to provide a cooling arrangement for the carburetor of an air cooled lawn and garden tractor.

Finally, it is an object of the present invention to provide a cooling arrangement which maintains the efficiency of the fuel system while minimizing the increase in the expense of the tractor.

SUMMARY OF THE INVENTION

In accordance with the invention there is provided a diverter for effecting a flow of air over the carburetor of a tractor which has an engine in an enclosure, an arrangement with shrouding for supplying cooling air to the engine, and a carburetor operatively connected to the engine and mounted within the enclosure.

BRIEF DESCRIPTION OF THE DRAWINGS

Other objects and advantages of the invention will become apparent upon reading the following detailed description and upon reference to the drawings, in which:

FIG. 1 is a perspective view of a lawn and garden tractor incorporating the carburetor cooling arrangement of the present invention and FIG. 2 is an enlarged perspective view of the section of the tractor wherein the carburetion arrangement is shown in greater detail.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIG. 1 there is shown a lawn and garden tractor 10 which incorporates the carburetor cooling configuration of the present invention. The tractor of the preferred embodiment has an air cooled engine 12 partially enclosed within the tractor's hood 14, grill assembly 16, frame 18, and side sheets 20. In the illustrated embodiment the carburetor 22 is mounted within this enclosure 24 on the left side of the engine 12.

The mounting of the carburetor 22 is shown in FIG. 1 in the section where the side sheets 20 are broken away and the air cleaner 26 is shown in phantom. In the particular device the inlet 28 for the air cleaner is a substantially elliptical tube mounted on the shrouding 30 of the engine cooling system. As shown in both FIGS. 1 and 2 the preferred embodiments carburetion system includes a fuel line 32 and a linkage arrangement 34 which are conventional for this application of the air cooled engine 12.

Although the linkage arrangement 34, the fuel line 32 and the carburetor connection to the engine are conventional, their use within the enclosure 24 necessitates a modification of the fuel system. This modification traditionally includes the use of a fuel pump, to avoid vapor lock which is caused by increased temperature within the enclosure.

In accordance with the present invention a diverter 36 is placed in the flow of the cooling air within the shrouding 30 to direct a portion thereof over the carburetor and its related elements. In the illustrated embodiment the air flow is counterclockwise (see double arrows) when viewed from the front of the tractor 10 and is produced by an engine mounted impeller (not shown) mounted within the shrouding 30. In carrying out the invention the diverter 36 of the preferred embodiment is an aperture 38 in the shrouding 30 which is upstream in the cooling air flow pattern from the position of the carburetor 22. With the diverter positioned as shown, a small portion of the engine cooling air (see triple arrows) is directed toward the carburetor.

As a result of the apertures diversion of cooling air over the carburetor, the operating temperature of the carburetor is drastically reduced and permits the elimination of the fuel pump. From the foregoing it will be seen that the practice of the present invention makes it possible to comply with the recent regulations on sound levels of tractors without sacrificing the efficiency or increasing expense of the vehicle when it is necessary to use an engine enclosure to comply with a noise regulation. It also follows that the invention can be practiced to cool the carburetor on either an air cooled or water cooled engine with the diverter either being upstream to force engine cooling air over the carburetor or downstream to cause a suction of air over the carburetor.

Thus, it is apparent that there has been provided, in accordance with the invention, a cooling arrangement for a tractor carburetor that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A carburetor cooling arrangement for an air cooled engine including, in combination:
    a carburetor mounted on said engine;
    a cooling air shroud mounted on said engine, having said carburetor outside the enclosure defined by said shroud, and having a diverter aperture in close proximity to said carburetor;
    cooling air means for controlled flow of cooling air through said shroud and over said engine, and for controlled flow of cooling air through said aperture to cause an air flow over said carburetor; and
    an enclosure substantially surrounding said engine, said shroud, said carburetor, and said cooling air means.

2. The carburetor cooling arrangement of claim 1, wherein:
    said aperture is positioned upstream of said carburetor in said cooling air flow, thereby forcing cooling air over said carburetor.

\* \* \* \* \*